US008711466B2

(12) United States Patent
Kroll et al.

(10) Patent No.: US 8,711,466 B2
(45) Date of Patent: Apr. 29, 2014

(54) ILLUMINATION UNIT FOR A DIRECT-VIEW DISPLAY

(75) Inventors: Bo Kroll, London (GB); Gerald Futterer, Dresden (DE); Ralf Haussler, Dresden (DE); Norbert Leister, Dresden (DE); Steffen Buschbeck, Erfurt (DE)

(73) Assignee: Seereal Technologies S.A., Munsbach (LU)

( * ) Notice: Subject to any disclaimer, the term of this patent is extended or adjusted under 35 U.S.C. 154(b) by 46 days.

(21) Appl. No.: 13/380,169

(22) PCT Filed: Jun. 18, 2010

(86) PCT No.: PCT/EP2010/058619
§ 371 (c)(1),
(2), (4) Date: Dec. 22, 2011

(87) PCT Pub. No.: WO2010/149583
PCT Pub. Date: Dec. 29, 2010

(65) Prior Publication Data
US 2012/0092750 A1 Apr. 19, 2012

(30) Foreign Application Priority Data

Jun. 23, 2009 (DE) .......................... 10 2009 027 093
Jun. 23, 2009 (DE) .......................... 10 2009 027 129
Aug. 28, 2009 (DE) .......................... 10 2009 028 984

(51) Int. Cl.
*G02B 26/00* (2006.01)
(52) U.S. Cl.
USPC ....................................................... 359/291
(58) Field of Classification Search
USPC ............ 359/291, 234; 349/61, 64, 65, 69, 96, 349/117; 362/559, 19; 385/30, 27, 385/123–127, 144
See application file for complete search history.

(56) References Cited

U.S. PATENT DOCUMENTS

| 5,596,671 A | 1/1997 | Rockwell, III |
| 6,118,503 A | 9/2000 | Oki et al. |
| 6,340,999 B1 | 1/2002 | Masuda et al. |

(Continued)

FOREIGN PATENT DOCUMENTS

| JP | 2007-234385 | 9/2007 |
| WO | 2004-109380 A1 | 12/2004 |

(Continued)

OTHER PUBLICATIONS

International Search Report, dated Oct. 29, 2010, issued in priority International Application No. PCT/EP2010/058619.

*Primary Examiner* — Tuyen Tra
(74) *Attorney, Agent, or Firm* — Saul Ewing LLP

(57) ABSTRACT

The present invention relates to a lighting device having a planer optical fiber and at least one light source device for illuminating a controllable spatial light modulator, wherein the optical fiber comprises a light-conducting core and a cover coating, and the light modulator comprises a pixel matrix, the light source device is disposed on the side of the optical fiber, and the light emitted by at least one light source of the light source device propagates laminarly in the optical fiber. The lighting unit according to the invention is characterized in that the planar optical fiber comprises a deflecting coating having a selective polarization function for laminarly decoupling and deflecting the evanescent wave field of the light propagating in the optical fiber, wherein the thickness of the cover coating reduces in the direction of light propagation.

27 Claims, 7 Drawing Sheets

(56) References Cited

U.S. PATENT DOCUMENTS

| | | |
|---|---|---|
| 6,577,782 B1 * | 6/2003 | Leaird et al. ............... 385/15 |
| 6,648,485 B1 | 11/2003 | Colgan et al. |
| 8,259,255 B2 * | 9/2012 | Yu et al. ............... 349/64 |
| 2001/0019379 A1 | 9/2001 | Ishihara et al. |
| 2001/0055076 A1 | 12/2001 | Ochi et al. |
| 2007/0076163 A1 * | 4/2007 | Crossland et al. ............ 349/196 |
| 2010/0259804 A1 * | 10/2010 | Buschbeck et al. ............ 359/34 |

FOREIGN PATENT DOCUMENTS

| | | |
|---|---|---|
| WO | 2006-006919 A1 | 6/2006 |
| WO | 2009-050273 A2 | 4/2009 |
| WO | 2009-071546 A1 | 6/2009 |

* cited by examiner

ILLUMINATION UNIT FOR A DIRECT-VIEW DISPLAY

CROSS REFERENCE TO RELATED APPLICATIONS

This application claims the priority of PCT/EP2010/058619, filed on Jun. 18, 2010, which claims priority to German Application Nos. 10 2009 027093.0, filed Jun. 23, 2009; 10 2009 027129.5, filed Jun. 23, 2009; and 10 2009 028984.4, filed Aug. 28, 2009, the entire contents of which are hereby incorporated in total by reference.

BACKGROUND OF THE INVENTION

The present invention relates to an illumination unit comprising at least one light source device and a planar light waveguide for illuminating a controllable reflective spatial light modulator, where the light waveguide comprises a light conducting core and a cladding, where the light modulator comprises a pixel matrix, where the light source device is arranged on the side of the light waveguide and where the light emanating from at least one light source propagates areally though the light waveguide. The spatial light modulator is designed to serve as a display panel of a direct-view display.

Illumination units can come as backlights or frontlights (also referred to as transmitted-light and reflected-light illumination devices, respectively) and generally serve to illuminate a transmissive or reflective controllable spatial light modulator (SLM) of a direct-view display. The light can be coherent or incoherent. Display devices which are operated with incoherent light are preferably used as 2D displays for autostereoscopic 3D presentations. Coherent light is required for example in holographic display devices.

The field of application of the present invention includes direct-view displays for the three-dimensional presentation of autostereoscopic and holographic images.

In a commercially available flat TV display for the presentation of two-dimensional images or videos, it is necessary to realise a bright and homogeneous illumination of the entire surface at high resolution. The SLM which serves as display panel is required to emit the light in a large angular range. Many physical forms of such displays are known in the prior art.

Most of them have a planar optical light waveguide (LWG). The planar LWG generally comprises at least one light conducting core and a cladding, both of which differing in the refractive index. The injected light propagates through the planar LWG in the form of pencils of rays or wave fields under the conditions of total internal reflection (TIR) and is coupled out to illuminate the display panel. Alternatively, the light is conducted without being reflected and coupled out through the cladding as evanescent wave fields of different modes m.

A number of issues need to be considered in a display device with backlight or frontlight and planar light waveguide to be able to realise an optimally designed illumination device. First, this relates to the physical form of a planar LWG itself, including the mechanisms for injecting and coupling out the light. Secondly, this relates to the physical form of the light source device including the light sources which supply the light. Further, it must be taken into consideration whether the display device is of a transmissive or reflective type.

In contrast to a flat TV display, an illumination unit in a autostereoscopic or holographic display device for the three-dimensional presentation of information must satisfy a number or further or different requirements. The information to be presented is written to the SLM of the display device. The light which is emitted by the light sources is modulated with the information that is written to the SLM, where the SLM typically at the same time serves as screen or display panel. It is therefore necessary to strictly ensure parallel incidence of the pencils of rays onto the SLM and to achieve a high refresh rate of the SLM.

SLM with very high refresh rates of for example 240 fps (frames per second) are required to be able to realise a three-dimensional presentation of information. The SLM panels which are used for light modulation in the display devices are often liquid crystal (LC) type SLMs, such as reflective SLMs of the LCoS type, which are currently achieving refresh rates of more than 400 fps in high definition (HD). A refresh rate of 1085 fps has already been realised with an LCoS array with 256×256 pixels, which was run at 15 V.

In contrast to transmissive SLMs, reflective SLMs often comprise a higher fill factor, thus allowing for an advanced suppression of undesired diffraction orders of coherent light if used in holographic display devices.

In LC displays, halving the thickness of the LC layer means to increase the refresh rate fourfold. Further, doubling the voltage also results in a fourfold increase in the maximum achievable refresh rate. This is because both the thickness of the LC layer and the voltage which is applied to the LC layer are squared in the expression used to calculate the maximum achievable refresh rate. With a non-transparent circuit carrier (backplane), increasing the voltage, frequency and current can be realised easily, because here the entire surface area is available for conductors, transistors and capacitors.

In addition to the necessary high refresh rate, great demands are made on the collimated emission of the light by the LWG. To achieve a high quality of the 3D presentation of the information, a defined collimation of the wave fronts that are coupled out is necessary in addition to a homogeneous illumination of the entire surface of the SLM. This is of particular importance for holographic presentations in the form of a reconstruction that is to be generated. The holographic information, which can for example be an object that is composed of object points of a three-dimensional scene, is encoded in the form of amplitude and phase values in the pixels of the SLM. Each encoded object point is represented by a wave front that is emitted by the SLM.

The angular range of a wave front that is emitted by the illumination unit is referred to as the 'angular spectrum of plane waves'. It has been found in practice that an angular spectrum of plane waves where the plane wave fronts comprise mutual deviations in the emission angle of more than 1/60° in the coherent direction will result in a blurred reconstructed object point. This blur can be perceived by the eye under optimum conditions. The emission angle of the spectrum of plane waves of a holographic display should therefore lie at least in the range of between 1/70° and 1/40° in the coherent direction. In the incoherent direction, it should be wide enough to illuminate at least the eye pupil.

Consequently, the collimated wave fronts which illuminate the SLM must a priori have a defined emission angle in relation to each other in order to circumvent the negative illumination-induced effects on the reconstruction to be generated. In autostereoscopic 3D presentations, the collimation of the pencils of rays enhances the image quality of the display device. The angular spectrum of plane waves should here be chosen such that the eye pupil of the other eye is not illuminated.

Collimated emission of coherent light can for example be achieved by using volume gratings which are arranged on or in the planar LWG. They represent a stack of transparent layers and can be described as modulated distributions of refractive indices in the X and Y direction; there are transmissive and reflective volume gratings. A 3D volume grating is generated by interference of two or more coherent or at least partly coherent waves. The structure of the volume grating is determined by parameters such as the wavelength in the material and the local angles between interfering wave fronts of the light used for recording. A volume grating is generally made such that a defined portion of energy can be coupled out in a specified angular range. Bragg's diffraction conditions apply to those gratings during reconstruction.

However, in order to be able to realise a limitation of the angular spectrum of plane waves that is coupled out of smaller than 1/20° with an illumination unit with planar light waveguide and volume grating as proposed in this invention, the volume grating is required to have a thickness of about 500 μm. Now, if the angular resolving power limit of the human eye of 1/60° is taken into consideration, the volume grating must have a layer thickness of e.g. 1 mm. The angular selectivity depends on the actual geometry of the reconstruction.

This fact is derived from Kogelnik's 'coupled wave theory'. However, this theory is only derived for volume gratings which are reconstructed in the first Bragg's diffraction order, i.e. it only applies to those.

Recording the holographic grating which works for example in a total internal reflection geometry, is technologically complex according to this theory, because very large angles had to be realised between the interfering wave fronts. Large prisms and a liquid index matching material (oil) are required to achieve large deflection angles. Further, this design will cause great layer thicknesses, a narrow angular selectivity of the volume grating and small grating periods which come close to the resolution limit of the available materials.

It is therefore an object to make the manufacture of the volume gratings which are required in the illumination unit more inexpensive.

There are further problems that need being taken into consideration in conjunction with the illumination unit with a volume grating.

If the light which propagates for example by way of total internal reflection is well collimated, then a wide angular selectivity is advantageous for easy adjustment. This can be achieved by reflective volume gratings, because they comprise a wider angular selectivity than transmissive volume gratings.

The thicker the volume gratings, the more reduced is the angular selectivity of the diffraction efficiency $\eta(\theta_{in})$. This means that a high diffraction efficiency near 1 is only available at a small angle. This can be taken advantage of to only couple a narrow angular range out of a light conducting layer.

If the collimation of the light which propagates for example by way of total internal reflection is too wide, then it is advantageous to realise a sufficiently narrow angular selectivity to get a narrow angular spectrum of plane waves. This is achieved with thick transmissive volume gratings.

An adaptation to the light that is actually to be coupled out can be achieved by choosing the parameters of the volume gratings accordingly.

Further, it must be noted that the grating period becomes the smaller the larger the emission angle of the light which is coupled out. This may bring about a resolution problem for the grating material that is used in the volume grating. Moreover, the resolving power limit of the human eye, which is about 1/60°, must be taken into account when producing the volume grating. If this limit is taken into account, the illumination unit e.g. in a holographic display must realise an angular spectrum of plane waves that ranges between 1/20° and 1/60° in order to illuminate the SLM with well collimated light.

A typical eye separation measures 65 mm. Given a distance to the display panel of 1 m, this corresponds to an angle of 3.72°. At an observer distance of 1 m, this is the geometric limit of the angular range of the plane waves emitted by the light waveguide in the incoherent direction from which cross-talking to the other eye occurs.

Widening of the diffraction order does not only occur in the coherent direction, but also in the incoherent direction. When taking this fact into consideration, the emission angle in the incoherent direction shall be chosen smaller than would be necessary according to the geometric-optical calculation.

Planar light waveguides are preferably used in illumination units of flat displays so to realise the flatness of those display devices. They are designed with the help of additional optical components such that the light is preferably emitted by the display in a large angular range in order to enlarge the viewing space in front of the display.

Document U.S. Pat. No. 6,648,485 B1 discloses a wedge-shaped light waveguide, i.e. one which is not coplanar, in which the light propagates by way of multiple reflections and which is used for homogeneous illumination of a flat display. In order to control the angle-dependent distribution of the light which is injected into the light waveguide, the entry surface of the wedge is for example fitted with a scattering surface profile. Further, the wedge is dimensioned such that the light leaves the frustrated total internal reflection (FTIR) condition during its propagation through the light waveguide.

However, to ensure the angular selectivity that an illumination unit of a holographic display device is required to have the wedge angle had to be much smaller than 1°. This is not realistic with a light waveguide according to that document.

Document JP 2007234385 A discloses a backlight with wedge-shaped light waveguide for a flat display, where the backlight comprises coloured LED light sources. Their light can be injected into the wedge in a divergent, convergent or parallel manner by reflectors which are designed in the form of paraboloid mirrors. The object is a homogeneous illumination of the entire surface of the flat display. Referring to FIG. 14 of that document, the exit angles of the light which leaves the light waveguide at an oblique angle are affected by subsequent optical components, e.g. a prism plate, such that the propagation angle of the light is much larger than 1/60°.

In document WO 2004/109380 A1, light emitted by light sources is injected into the widest face of the wedge-shaped waveguide of a flat display through a cylindrical mirror. It propagates through the waveguide by way of multiple reflections. The emitted light is distributed homogeneously across the waveguide by a prism foil, where the emission angle is not smaller than 15°.

Flat displays with light waveguides which are known in the prior art, including those described in the above-mentioned documents, are not suited due to their emission characteristics to satisfy the great demands which are made on an illumination unit of a fast switching display device. They do not offer the possibility to generate a near-flawless reconstruction of an object in a holographic direct-view display device.

SUMMARY OF THE INVENTION

It is thus the object of the present invention to provide a flat illumination unit based on a planar light waveguide for a direct-view display device with very high refresh rate. The light which propagates through the light waveguide and which is coupled out from there shall have a defined emission angle for homogeneously illuminating a controllable spatial light modulator (SLM), where the angular range which is to be maintained by the light that is coupled out differs depending on the actual encoding. The angular spectrum of plane waves that are coupled out of the LWG shall be smaller than 1/20° in any case so to be able to achieve the necessary layer thickness of the volume gratings.

The illumination unit must also be capable of providing light for full colour presentations without much additional effort.

The angular spectrum of plane waves of the light which are emitted in the incoherent direction shall be sufficiently wide so to allow the begin of a tracking operation to be delayed somewhat when an observer or multiple observers start to move, and to generally reduce the required tracking accuracy in the incoherent direction.

A small number of individual optical components shall only be used in the illumination unit, and these shall be made with proven, simple and cost-efficient manufacturing technologies.

It is a further object of the present invention to design the flat illumination unit such that it allows a one-to-one assignment of individual modulator cells of the SLM and individual EW prism cells when used in conjunction with an electrowetting (EW) prism cell array in the display device. Since EW prism cells widen the angular spectrum of plane waves at large deflection angles, the angular spectrum of plane waves which falls on the EW prism cells shall be chosen sufficiently small so that there is no cross-talking to the other eye even if the emission angle is large.

The solution is based on an illumination unit which comprises at least one light source device and a planar light waveguide for illuminating a controllable spatial light modulator, where the light waveguide comprises a light conducting core and a cladding, where the light modulator has a pixel matrix, where the light source device is arranged lateral to the light waveguide and where the light which is emitted by at least one light source propagates areally though the light waveguide.

According to this invention, the object is solved in that the planar light waveguide comprises on top of the cladding a deflection layer with a polarisation-sensitive function or with a specifiable output coupling characteristic for areally output coupling and deflecting the evanescent wave field of the light which propagates in the light waveguide, where the cladding is made such that its thickness tapers down in the direction of light propagation.

The thickness of the cladding decreases starting from the light entry side of the waveguide along the direction of light propagation to the opposite side of the waveguide. The taper can have an exponential distribution.

In a first preferred embodiment, the illumination unit is designed in the form of a frontlight or reflected-light type illumination device. The spatial light modulator which is to be illuminated is of a reflective type and comprises a layer that turns the entry polarisation of the light that is coupled out such that the settable exit polarisation is achieved after the second passage of that layer. This layer is a λ/4 layer or a structured layer or an unstructured layer. The light emanating from the light source device can be totally coherent, partially coherent in one direction or incoherent in both directions, depending on the light sources which are actually used.

For polarisation-sensitive output coupling and deflection, either a scattering layer or a layer-type micro-prism array can be arranged in the illumination unit. The geometry of the micro-prism array must be optimally adapted to the scattering angle that is to be realised. This depends on whether the illumination unit is used to illuminate a display panel of an autostereoscopic display or that of a holographic direct-view display.

In a further embodiment of the illumination unit, the deflection layer for polarisation-sensitive output coupling and deflection can comprise at least one holographic volume grating.

Further, an electrowetting prism cell array or a light deflecting layer can be arranged behind the illumination unit in a display device in the direction of light propagation, where the deflection is variably controllable. This arrangement is designed such that the distance between the pixel matrix and the electrowetting prism cell array or other light deflecting layer lies in a range of <15× the period of the pixels of the pixel matrix in the coherent direction. Then and only then a one-to-one assignment of pixels and EW prism cells can be realised without the occurrence of cross-talking. The range of values is derived from the arithmetical verification (near-field simulation) of the illumination unit according to this invention.

In the illumination unit, the light propagates through the light-conducting core in a collimated manner in at least one direction. However, the light can also propagate on a zig-zag path. If the light-conducting core is not coplanar, i.e. if it is no planar light waveguide, but if it is rather a wedge-shaped light-conducting core, then the zig-zag modes which are generated after each reflection become steeper. The steeper zig-zag modes penetrate deeper into the cladding and can then be caught by the volume grating and deflected towards an SLM.

In order to satisfy the requirements regarding flatness, there are several physical forms and combinations of the components of the illumination unit. First, the cladding can have a constant thickness and the volume grating can be made such that it comprises an exponentially increasing output coupling efficiency.

Secondly, the cladding can have a constant thickness again and be combined with a light-conducting core whose thickness increases in the direction of light propagation.

In a second preferred embodiment, the illumination unit is designed in the form of a backlight or transmitted-light type illumination device, where the spatial light modulator is of a transmissive type. UV-light-emitting light sources can be used here, for example. In this arrangement, the deflection layer comprises a fluorescent layer for converting the UV light into white light.

Further, the light-conducting core and the cladding can comprise a refractive index difference Δn relative to each other which decreases along the optical path, thereby realising an increase of the penetration depth of the evanescent electromagnetic field into the cladding.

In another physical form of the illumination unit, the light-conducting core is made in the form of a holographic volume grating. This is to provide a layer which has both a conducting and an output coupling function for the light at the same time. There are materials which do not comprise shrinkage and which do thus not show any alteration of the recorded grating geometry.

Although reflective volume gratings generally show a wider angular selectivity than transmissive volume gratings, this can be corrected during the manufacturing process. The transmissive volume grating is preferably manufactured by overexposing to the second peak of the diffraction efficiency. This is to attain a widening of its angular selectivity, so that a wider angular range e.g. in the reconstruction geometry can be deflected and thus be coupled out areally. Further, broad tolerances can therefore be permitted, and a higher total efficiency of the illumination can be achieved. This option of overexposing volume gratings is applicable to both the reconstruction with coherent light and the reconstruction with incoherent light.

If the collimation of the light sources which are used in an illumination unit for a holographic display device only generates an angular spectrum of >1/20°, i.e. if it is not adequately collimated, then the volume grating must be made such that it only couples out a small angular range. To this end, the angular selectivity of the volume grating must be sufficiently narrow, e.g. be limited to <1/20°.

Reducing the angular spectrum of plane waves which are coupled out can be achieved by a higher diffraction order, as for example by the second Bragg's diffraction order. If a 3D scene is reconstructed in the second Bragg's diffraction order, then, if the volume grating has a homogeneous thickness, a smaller angular spectrum of the diffraction efficiency $\eta(\Theta)$ is achieved compared with the first Bragg's diffraction order.

Using a volume grating which is made with the second Bragg's diffraction order has the following advantages:

Gratings of the second Bragg's order can be recorded with the first Bragg's order, which makes the use of prisms and index matching materials superfluous. This brings about a clear cost advantage in the production of volume gratings. Volume gratings which realise great deflection angles must normally be recorded with large prisms and index-matching immersion liquids.

Holographic volume gratings which work in a total reflection geometry with large diffraction angle have a grating period $\Lambda$<0.5 µm. This represents the resolution limit for many materials or is at least close to it. The reproducibility of the grating parameters which are to be ensured is reduced near the resolution limit of the materials.

The period of volume gratings which show the same reconstruction geometry, but which realise it in the second Bragg's diffraction order, is twice as large as that of volume gratings which are reconstructed with the first Bragg's diffraction order, and thus far away from the structural resolution limits of holographic materials. This increases the reproducibility of the parameters of the volume grating noticeably and allows to circumvent the resolution limit of the holographic recording material.

Using the second Bragg's diffraction order makes it possible to almost halving the layer thickness of the volume grating that is necessary to restrict the angular spectrum of plane waves that are coupled out. A layer thickness of 250 µm, for example, is sufficient to achieve the same results instead of the above-mentioned 500 µm.

This means that a sandwich construction of the volume gratings is more stable mechanically and thermally. The required quantity of the holographic recording material is also halved.

Further embodiments can be designed which incorporate the frontlight-type illumination unit FLU according to this invention:

A light modulator device with a reflective light modulator which comprises at least one areal polarisation filter, an addressable transmissive layer with a matrix of pixels and a transmissive substrate layer with a matrix of retroreflectors can be illuminated by at least one of the embodiments of the illumination unit which have been described above.

The reflective light modulator in the light modulator device can comprise a matrix of pixels with at least one LC material which provides at least two LC modes with different orientation for modulating the phase and/or amplitude of polarised light as controlled by the system controller.

The pixel matrix of the reflective light modulator in the light modulator device can comprise at least one LC material which is controllable by the system controller for at least two LC modes being differently oriented for modulating the phase and/or the amplitude of polarised light.

In a preferred embodiment, phase and amplitude values of a hologram of a 3D scene can be encoded in the pixels of the reflective light modulator of the light modulator device.

A direct-view display can comprise an illumination unit which has inventive features of at least one of the embodiments described above according to at least one dependent claim and/or which can combined with a spatial light modulator of a light modulator device, said spatial light modulator being arranged downstream of the illumination unit seen in the direction of light propagation and being provided with features of the claims of the light modulator device.

This is to say that the present invention can be used in direct-view displays of both reflective and transmissive type. Transmissive displays thus preferably comprise an illumination unit with a transmissive spatial light modulator which is arranged downstream of the illumination unit in the direction of light propagation. In reflective displays, the reflective light modulator is arranged upstream of the illumination unit in the direction of light propagation.

Thanks to the inventive construction and combination of the light-conducting core, cladding and deflection layer, it is preferably achieved that the illumination unit can be of an extremely flat design.

Now, a number of measures will be described which allow the embodiments described below to be realised in conjunction with an illumination unit according to this invention.

For example, a $\lambda/4$ plate or retardation plate or retardation layer could be arranged downstream of the output coupling side in the direction of light propagation.

A reflective or transmissive light modulator could be arranged downstream of the output coupling side in the direction of light propagation.

A reflective light modulator could be arranged downstream of the output coupling side in the direction of light propagation, said light modulator comprising a reflection layer with a predefined scattering characteristic. This measure is particularly preferably suited to present two-dimensional image contents in direct-view displays.

A reflective or transmissive beam deflection device could be arranged downstream of the output coupling side in the direction of light propagation.

The beam deflection device could comprise at least one transmissive or reflective electrowetting cell array or a diffraction device.

According to a preferred embodiment, the light modulator is made such to modulate the phase of the light which interacts with the light modulator. A beam splitter and beam combiner device is provided between the reflective light modulator and the illumination unit.

Specifically, the light modulator could be made such to modulate the phase of the light which interacts with the light modulator. The light modulator comprises a matrix or array of reflective electro-wetting cells.

The light which is coupled out of the illumination unit preferably passes through the illumination unit substantially without being deflected after a reflection. This can be realised in that the illumination unit and the optical component which are arranged downstream of it are provided to have adequate properties.

Now, the embodiments which can be realised by implementing the above-mentioned measures will be described.

Reflective LC SLM:

Thanks to the modifications proposed here, such as coating a substrate of the SLM with a reflective layer, it is possible to construct and to operate such an SLM or display in a reflective mode.

In a reflective LC display or SLM, the required layer thickness of the LC layer is preferably halved, because the light passes through this layer twice due to its reflection. Since the response time of an LC display depends on the square layer thickness, it is possible to realise displays with high refresh rates and short response times.

In optical applications where a coherent or at least partly coherent illumination is required, as for example in holographic applications, phase displays are preferably used. In several types of LC displays, such as vertical-alignment (VA) displays, a phase-modulating display with phase modulation in a modulation range of 2π would have about twice the layer thickness as a conventional amplitude-modulating display with comparable other parameters (such as LC material, control).

A reflective phase-modulating display would thus require about the same thickness of the LC layer as a transmissive amplitude-modulating LC display. It is thus provided, e.g. by adding a reflective layer while substantially maintaining other design parameters, to modify a conventional transmissive amplitude-modulating display such that it can be operated as a reflective phase-modulating display.

The fill factor of a transmissive display is typically limited by the surface area that is required for the conductors etc. (black matrix). This causes loss of light. In holographic applications, more light is diffracted into higher orders due to diffraction at such structures and because of the reduced fill factor. In contrast, in a reflective display it is preferably possible to get a larger active area if conductor paths, thin-film transistors (TFTs) etc. are arranged behind the reflective layer.

It is thus provided to construct an LC display or a TFT display of a reflective type and to use it in combination with an illumination device which provides front-side illumination of a reflective light modulator (SLM). Such an illumination device comprises a light waveguide where the light which propagates through the light waveguide is coupled out—preferably areally—evanescently by a volume grating which is attached to it. Such an illumination device is described for example in document DE 10 2009 028 984.4. Generally, an illumination unit according to the present application can be used in the same way, also in conjunction with the embodiments that will be described below. This arrangement generates a substantially collimated light wave field with a specifiable polarisation. Such an illumination device or illumination unit can preferably be made to have a very flat design.

Light can be injected through a side face with the help of a polarisation beam splitter geometry. Linear polarised light could for example be deflected by 60 degrees by the volume grating. The volume grating is arranged in the illumination device such that the light leaves the illumination device substantially at right angles to its surface. It can then be deflected towards an SLM. This light is then reflected by the SLM. The polarisation of the light is turned, e.g. with the help of a retardation plate, such that the light, once it has been reflected by the SLM, can pass through the illumination device without any obstruction.

This illumination device can generally also be realised having a large surface area.

Typical reflective displays, as for example those based on liquid crystal on silicon (LCoS), are only available in small sizes and are thus not suited to be used in conjunction with a large-area illumination device.

Here, the illumination device is designed and arranged such that the collimated light wave field propagates towards the light modulator, which modulates the light of the light wave field in a reflective way.

FIG. 6 shows schematically one embodiment of a display device with a reflective SLM. Here, the at least partly coherent light is injected into the frontlight illumination device FRL and coupled out substantially collimated and areal and with homogeneous intensity distribution towards the SLM. A λ/4 plate which serves to change the polarisation of the linear polarised light that is coupled out of the frontlight illumination device FRL is arranged between the frontlight illumination device FRL and the light modulator SLM; the polarisation of the light is for example turned by 45 degrees. The light falls on the SLM and is here modulated in accordance with the actual control state of the SLM (as controlled by a control device which is not shown in FIG. 6). The reflective SLM reflects this light, and the reflected light passes through the λ/4 plate Y4 again. It is here turned by another 45 degrees, so that the light which is reflected by the SLM can pass through the frontlight illumination device FRL substantially lossless and non-deflected in order to be deflected in a specifiable way by the subsequent deflection device TR.

Frontlight and Tip-Tilt Micro-Mirror SLM for Phase Modulation and Tracking:

Micro-mirror arrays, so-called digital micro-mirror devices (DMD), which are known in the prior art, can be used as SLMs. Certain types of micro-mirror arrays allow the elevation (tip) of the mirrors to be varied, which can be used for phase modulation of the light which is reflected by the micro-mirror array. Other types allow the micro-mirrors to be tilted. It is further known that these two modulation types can be combined in a single micro-mirror element. It has been proposed in document WO 2007/099458 A2 to take advantage of this combination to encode the hologram itself.

Tip-tilt mirrors also represent a possibility to combine hologram encoding and tracking of observer windows to actual observer eye positions (e.g. as described in the section on tracking in document WO 2006/066919 A1) in conjunction with the prism terms which can be encoded in the SLM. In other words, the tip function of such a micro-mirror array would correspond with the function of a phase-modulating SLM (including phase continuation), and the tilt function would realise the tracking function (including field lens). Phase continuation shall particularly be understood such that a continuous phase profile can be set. This phase continuation can be achieved in that the height difference between neighbouring mirrors is set by using the tip function such that it exactly corresponds with a phase difference that is a multiple of 2π at the transition of one mirror element to the next one for the actual tilt of the mirrors.

A field lens function serves to focus light from different positions of the display to a settable position or to a settable region in an observer plane. For example, Z tracking, i.e. tracking of the observer window in the axial dimension of the display (i.e. when the observer eyes move towards the display or away from the display), requires a variable field lens function.

This arrangement would thus include a frontlight-type illumination device and a combined SLM/tracking unit. This would mean a simplification compared with a sandwich design comprising individual components which realise tracking on the one hand and SLM on the other.

Beam Combiner for Reflective Arrangement:

Embodiments of a so-called beam combiner (BC) are described for example in the European patent application EP09163528 or in the German patent application DE 10 2009 044 910.8. Such a beam combiner (BC) allows in particular to superpose light beams which pass through different and/or neighbouring pixels of an SLM and which therefore comprise a laterally offset position in relation to the major direction of light propagation such that the light beams pass through substantially the same cross-sectional area (i.e. overlap) on the one hand and propagate substantially in the same direction on the other. Several of those embodiments (Savart plate, Bragg sandwich, liquid crystal polarisation gratings LCPG) take advantage of differently polarised light for the two pixels.

In the transmissive arrangement, a retardation layer which is spatially structured in relation to the surface of the SLM, e.g. in the form of a $\lambda/2$ plate which creates different polarisations for the light from the two pixels that are to be superposed, is required. This retardation layer must be precisely aligned with the geometric shapes of the pixels of the SLM.

In a reflective arrangement, the beam combiner BC can be arranged between a frontlight FRL and a reflective SLM. The light consequently passes through the BC twice. This is shown schematically in FIG. 8.

The element BC has the function of a beam splitter for the adequately polarised light on its way to the pixel. The polarisation of the light which is emitted by the frontlight FRL is chosen such that it is split by the BC such that 50% fall on the one pixel P1 and 50% fall on the other pixel P2 of the pixel pair of the SLM. On its way back (i.e. after being reflected by the SLM), the light Pol1 and Pol2 is recombined by the beam combiner BC on the same way.

Depending on the actual design of the SLM, the structured retardation layer in front of the two pixels may be omitted. This is for example the case in an EW-cell phase-modulating SLM as described below.

In an SLM which requires a certain polarisation for modulation (such as the LC SLM described above) a suitable structured retardation layer can be arranged between SLM and beam combiner. For example, a $\lambda/2$ layer VZ can be arranged in front of every other pixel P1, so that the polarisation is turned by 90 degrees before the light enters the SLM and that it is turned back to its original polarisation once the light leaves the SLM.

A frontlight according to DE 10 2009 028 984.4 or to the illumination unit according to this invention typically uses a $\lambda/4$ layer between frontlight and SLM so that the polarisation is turned by 90 degrees after the second passage of the light and that it can pass through the frontlight substantially without being deflected on its way back. If combined with the reflective beam combiner, it is possible to omit a polariser that follows the beam combiner and the $\lambda/4$ layer that follows the illumination device. Phases of the SLM pixels are then chosen such that same phases of the two pixels correspond to a minimum amplitude of the complex number which is encoded by the two phase values and that phases which comprise a phase shift $\pi$ correspond to a maximum amplitude of the complex number which is encoded by the two phase values.

When the light passes through the frontlight a second time after its recombination in the beam combiner, the frontlight acts as a polariser which transmits the settable light and deflects the remaining light depending on the phase of the pixel (the deflected light is indicated by a dotted line in FIG. 8). The remaining light is thus injected into the frontlight again and may be recycled. FIG. 8 is a schematic side view that shows an embodiment of such an arrangement. The reference designation AP denotes an aperture arrangement which is arranged in front of every other pixel and which serves to block a part of the light beams LS that are coupled out of the frontlight FRL.

Frontlight and Reflective Amplitude-Modulating LC SLM without Polariser (2D Display):

A transmissive amplitude-modulating LC SLM is normally arranged between two crossed polarisers. Only light whose direction of polarisation is turned will pass through the SLM. The non-turned portion is absorbed by the second polariser. Since the frontlight according to DE 10 2009 028 984.4 or an illumination unit according to this invention couples in/out one direction of polarisation but lets straight through another direction of polarisation, it also acts like a polariser, as has already been described in the section "Beam combiner for reflective arrangements" above.

In an arrangement with a frontlight-type illumination device and an amplitude-modulating light modulator, it is therefore possible to omit the $\lambda/4$ plate and polarisers of the amplitude modulator.

Reflective Phase-Modulating SLM with Electrowetting Cells:

Document WO 2009/050273 A2 discloses a phase-modulating SLM which takes advantage of the electrowetting (EW) principle. It comprises an electrowetting cell arrangement with EW cells Z, which are for example arranged in a matrix, and which are filled with three immiscible liquids L1, L2, L1 and which thus has two interfaces G, G' with the two interfaces G, G' being oriented substantially parallel. This is shown schematically in FIG. 7A.

The optical path length changes by way of parallel tilting of the two interfaces G, G', which represents a phase modulation. This arrangement has the disadvantages of having a great height H of the EW cell Z, and of showing a lateral offset $\Delta L$ of the light beams which pass through the EW cell Z when the interfaces G, G' are tilted, said offset varying according to the actually set phase value.

It is therefore proposed here to design a phase-modulating SLM with EW cells based on an EW cell Z—as shown exemplarily and schematically in FIG. 7A—such to work in a reflective way in that a base area (bottom or lid) M of the EW cell Z is given a reflective coating. Compared with the transmissive embodiment, this arrangement has the advantage of having a lower cell thickness H. Because the EW cell Z is passed twice, the maximum phase change of the light that is to be realised in one direction is only $\pi$, and not $2\pi$. An important advantage is the fact that the lateral offset $\Delta L$ which is given to the light on its way through the EW cell Z is compensated on its way back, as it is given the same lateral offset in the opposite direction. Consequently, a light beam leaves the reflective EW cell Z substantially without any lateral offset. Such a reflective SLM with EW cells can be combined with the illumination device according to document DE 10 2009 028 984.4 or with an illumination device according to this invention.

FIG. 7A and FIG. 7B contrast an EW cell Z of a transmissive phase-modulating SLM with EW cells according to document WO 2009/050273 A2, and a pixel of a reflective phase-modulating SLM with EW cells. The immiscible liquids in the EW cells Z are given the reference designations L1 and L2. An interface G, G' forms between two different liquids L1, L2. One of the liquids is here a polar liquid, the other one a non-polar liquid. Electrodes and control elements for controlling the EW cells Z which are provided at the EW cells Z are not shown in FIGS. 7A and 7B. Only a single beam bath is shown in the drawing. The arrows indicate the direction of propagation of the light beams.

Tracking with Reflective EW Cells:

The illumination device according to document DE 10 2009 028 984.4 or an illumination unit according to the present invention can also serve to illuminate in a reflective manner an EW cell array with EW cells that are arranged in a matrix or other regular pattern for deflecting light beams. If a base area M of an EW cell Z is reflective, then the interface G which deflects the light is passed twice. Consequently, much greater deflection angles β are achieved at the same prism angle α if there is just one interface.

Considering the symmetry, it is found that an EW cell Z of an EW cell array or of an EW cell tracking arrangement with two liquids L1, L2 which is operated in a reflective manner has the same properties as regards deflection angle, truncation (light beams hit an internal wall of the EW cell and cannot leave the EW cell as intended) and squeezing (compression of a pencil of rays, as described in document DE 10 2008 000 438.3) as an EW cell Z with three liquids L1, L2, L1 with symmetric angles of the two interfaces G, G' which is operated in a transmissive manner and which is twice as high. This is illustrated in FIGS. 9A and 9B. FIG. 9A shows an EW cell Z with three liquids L1, L2, L1. The broken line indicates a plane of symmetry S of the EW cell Z. The interfaces G, G' are shown as well. FIG. 9B shows a reflective EW cell Z with two liquids L1, L2, which is basically half the EW cell Z of FIG. 9A. This EW cell Z has a reflective face M on the right-hand side.

In an EW cell array which comprises reflective EW cells as shown in FIG. 9B, the demands made on the construction and manufacture are much lower, that is in particular with view to the filling with two liquids, the manufacturing process (cell height, number of electrodes per EW cell in the EW cell array) and addressing, compared with an EW cell array with EW cells with three liquids as shown in FIG. 9A. However, it would generally also be possible to operate other types of EW cells with more than two liquids in a reflective mode, for example in order to increase the deflection angle range further.

In such a reflective EW cell tracking arrangement TR, the frontlight FRL can illuminate the EW cell tracking arrangement TR, which serves as deflection unit, and the SLM would be arranged as the last element in the optical path following the EW cell tracking arrangement TR. The condition for this would be that the SLM is able to cope with an inclined passage of the light. FIG. 10A illustrates such an arrangement of components. The diagram shows from left to right the reflective EW cell tracking arrangement TR, the λ/4 plate Y4, the frontlight FRL and, facing the observer, the SLM panel.

However, the order of components in the optical path could generally also be as follows: the frontlight FRL, the λ/4 plate Y4, the EW cell tracking arrangement TR, the reflective SLM panel and a second passage through the EW cell tracking arrangement TR. Then, the EW cells of the EW cell tracking arrangement TR would not be reflective themselves, but nevertheless be passed twice by the light beam. The SLM would then not always be illuminated at a right angle of incidence, but the angle of incidence would be smaller than in the arrangement shown in FIG. 10A and described above. Referring to FIG. 10B, the arrangement includes from left to right the SLM, the EW cell tracking arrangement TR, the λ/4 plate Y4 and the frontlight FRL.

FIG. 11 shows a particularly preferred embodiment of a display device according to this invention. Here, linear polarised light (indicated by the circle with dot or circle with cross) is injected into the light waveguide LL of the frontlight FRL. The frontlight is designed as described in document DE 10 2009 028 984.4 or as an illumination unit according to the present invention. A volume grating VoIG is arranged at a very small distance to the light waveguide LL such that the light which propagates through the light waveguide LL can be coupled out evanescently and areally. Here, the light LS which is coupled out is again linear polarised (indicated by the circle with dot or circle with cross). This light LS is collimated and propagates towards the light modulator SLM. A beam combiner BC is arranged between the illumination device, which is designed in the form of the frontlight FRL, and the light modulator SLM. This beam combiner BC is made such that it splits the linear polarised light LS into two partial beams. One of the partial beams passes the beam combiner BC substantially without being deflected and hits a pixel P1 of the light modulator SLM and is modulated and reflected by the pixel P1 (indicated in grey in the drawing). The other partial beam is deflected by the beam combined BC and hits the pixel P2 of the light modulator SLM, and it is modulated and reflected by the pixel P2 of the light modulator SLM. The partial beams which are modulated and reflected by the light modulator SLM are then recombined by the beam combiner BC to form one light beam LSR. The recombined light beam LSR comprises a polarisation which can generally be elliptic and which depends on the difference in the phase values which are written to the pair of pixels. The phase values are chosen such that one portion with a polarisation that is turned by altogether 90 degrees (indicated by the double arrow) corresponds to the amplitude of the complex number which is encoded by the pair of phase values, as opposed to the light beam LS which is coupled out of the frontlight FRL. This portion of light beams LSR which is reflected by the light modulator SLM and recombined by the beam combiner BC can pass through the frontlight FRL substantially without being deflected, while the remaining portion of the light is re-injected into the frontlight. The frontlight FRL thus has the function of a polariser at the exit of the beam combiner BC. The light beams LSR pass through a first volume grating VG1, which deflects the light beams LSR by an angle of for example 30 degrees in one direction. The deflected light beams pass through a second volume grating VG2, which fulfils the function of a field lens. A first diffraction device BG1, which serves to deflect the light beams LSF which come from the second volume grating VG2 in the vertical direction so to realise observer tracking, is arranged downstream of the two volume gratings VG1, VG2 in the optical path. The second diffraction device BG2 serves to deflect the light beams in the horizontal direction for observer tracking. The diffraction devices BG1, BG2 can be designed as described in documents DE 10 2009 027 100.7, DE 10 2009 028 626.8 or DE 2010 028 398.3 and be controlled such to realise tracking.

BRIEF DESCRIPTION OF THE DRAWINGS

The invention will now described in more detail below with the help of embodiments and in conjunction with the accompanying schematic drawings, which are side views unless otherwise specified, where.

Like reference designations denote like components in the individual Figures and accompanying description.

DETAILED DESCRIPTION OF THE INVENTION

The present invention can be used for both transmissive and reflective display devices in direct-view displays. However, since reflective direct-view displays comprise greater advantages, embodiments of flat illumination units for reflective display devices will preferably be described below.

Figure 1:
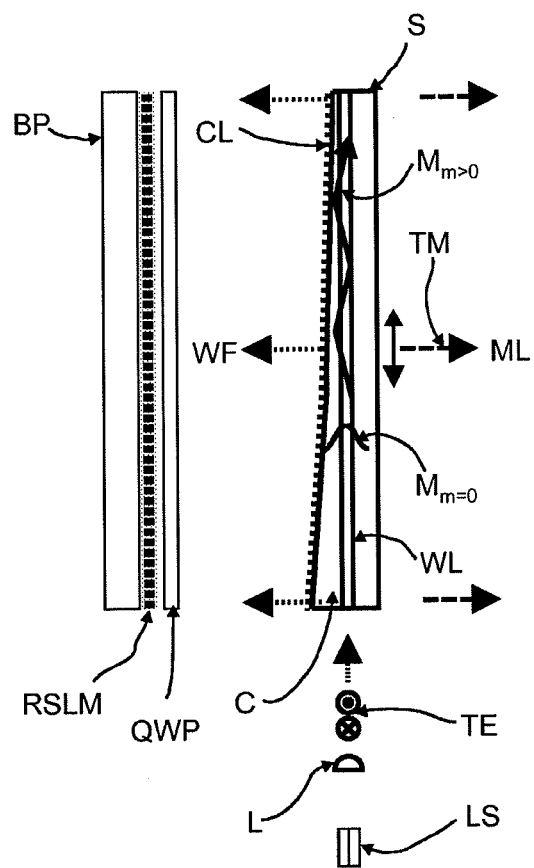
FIG. 1 shows a first embodiment of a flat illumination unit for a display device with reflective SLM.

FIG. 1 illustrates a first embodiment of a flat illumination unit for a reflective display device.

The following optical and electrical components with large-area surfaces are arranged one after another from left to right in the given order: a substrate layer with a circuit carrier (backplane BP), which accommodates any electric circuitry and conductors which are required for the functionality of the display device, a reflective light modulator RSLM and a λ/4 layer QWP. This arrangement is now followed by the illumination unit as such. It includes a light waveguide comprising a cladding C, a light-conducting core or waveguide WL and a substrate layer S. The side of the cladding C which faces the light modulator RSLM has a deflection layer CL. The thickness of the cladding C is reduced from the light entry side to the opposite side of the light waveguide in the direction of propagation, e.g. from 10 μm to 2 μm. This taper is necessary to keep the intensity of the light to be coupled out at a constant level. The wave front WF which is emitted by the deflection layer CL is reflected by the light modulator RSLM and—after passage of the light-conducting core WL and illumination unit—turns into a modulated wave front ML with a polarisation TM which is turned by 90° compared to the initial polarisation. The direction of polarisation PM is indicated by the double arrow.

Figure 4:
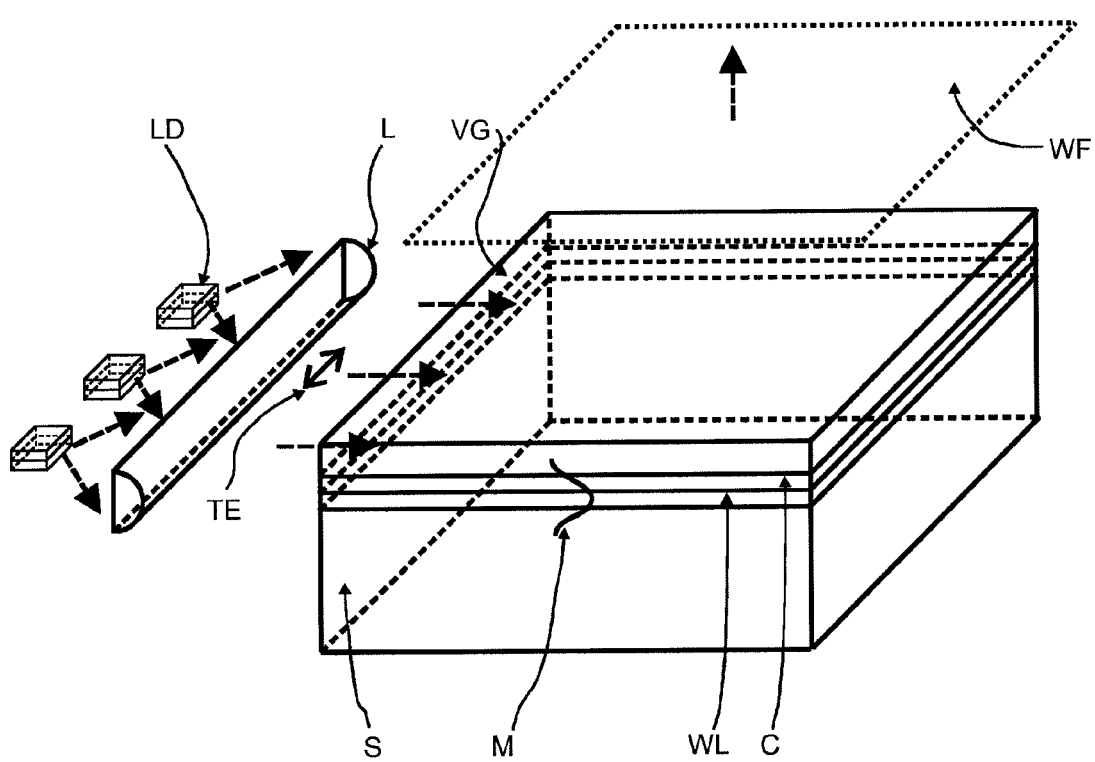
FIG. 4 is a perspective view of an illumination unit for a direct-view display which can be used both as frontlight or backlight.

The light source device is arranged on one side of the light waveguide, in this drawing on the bottom side. It comprises at least one further lens L, which is arranged in the direction of propagation of the light which is emitted by the at least one light source LS. The E field of the light preferably lies in the plane of the light conducting core WL and is hence transverse-electric (TE) polarised. The direction of light propagation is indicated by an arrow. FIG. 4 shows the light source device in more detail.

Figure 3:
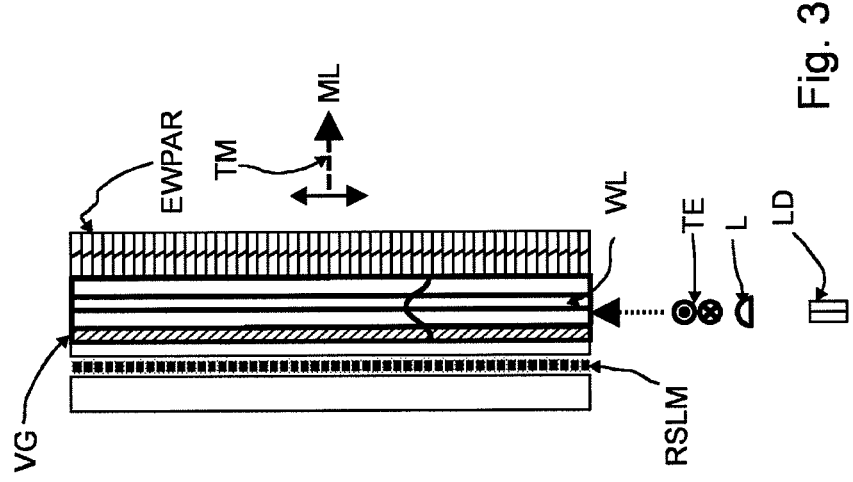
FIG. 3 shows the components of FIG. 2 being assembled to form a reflective display device as one unit.
Figure 2:
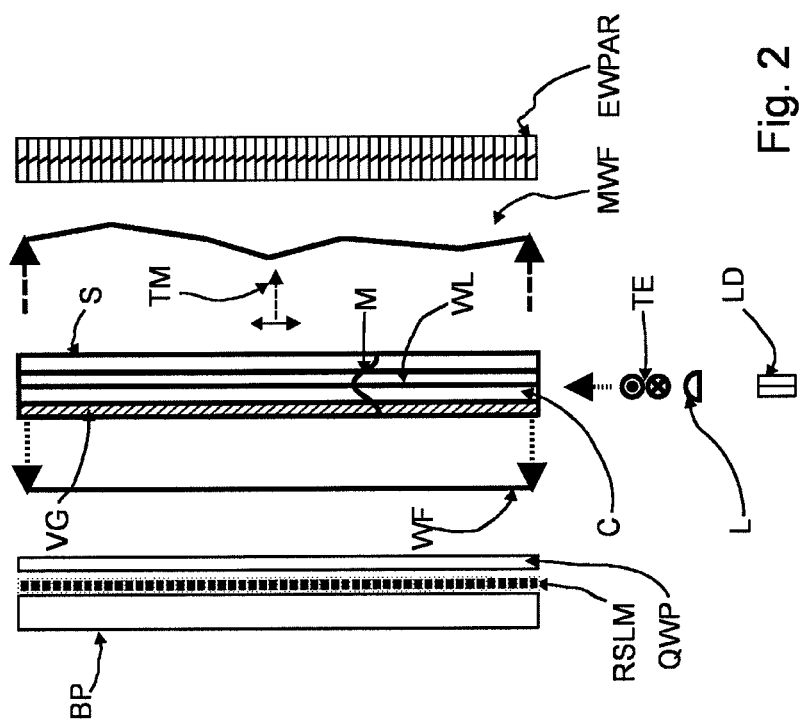
FIG. 2 shows a second embodiment of a flat illumination unit for a display device with reflective SLM and an EW prism cell array in a comprehensible way with the individual parts pulled apart.

Further, a wave shown in FIG. 1 but also in FIGS. 2 to 4 illustrates the evanescent wave field of one mode $M_{m=0}$ in the light-conducting core WL of the light waveguide, which penetrates into the neighbouring layers and which is deflected towards the light modulator RSLM. The further the light propagates in the waveguide WL, the more reflections with modes $M_{m>0}$ will be generated. One mode represents a certain type of oscillation of the light. The more reflections there are in the waveguide WL, the more modes M will be generated and contribute to the output coupling and deflection of the light.

FIG. 2 shows a second embodiment of a flat illumination unit for a display device with reflective SLM and an EW prism cell array. The individual elements are shown pulled apart in this drawing for easier comprehension.

Three main assemblies are arranged from left to right. As shown in FIG. 1, the first one comprises a backplane BP, a reflective light modulator RSLM and a λ/4 layer QWP.

The second, central component comprises a volume grating VG which serves as a deflection layer CL, a tapered cladding C, the light-conducting core WL and a substrate layer S. After having passed through the light waveguide, the light leaves in the form of a modulated wave front MWF and proceeds to the third component. The latter comprises an electrowetting prism cell array EWPAR, which realises the function of a tracking device in a direct-view display.

The light source device is arranged on one side of the light waveguide, in this drawing on the bottom side. It comprises at least one light source in the form of a laser diode LD and at least one lens L in the direction of light propagation, which is indicated by an arrow. The light is shown with its polarised portions TE and TM of the electric field which are present on entry into the deflection layer CL.

The light which is emitted by the laser diode LD is collimated by a lens L and propagates through the light-conducting core WL as TE-polarised light. The functional principle of the illumination unit is the same as that in FIG. 1 and will be described further below.

The construction of a reflective display device shown in FIG. 2 is sufficiently flat to realise a one-to-one assignment of the reflective pixels and the cells of the EWPAR. This allows diffraction-induced cross-talking to be kept to a minimum.

FIG. 3 shows the components of FIG. 2 in assembled form, where only the most important reference designations are shown to keep the drawing comprehensible, and where the same reference designations are used as in FIG. 2.

FIG. 4 is a perspective view of an illumination unit for a direct-view display which can be used both as frontlight or backlight, and which here emits coherent light. Laser diodes LD serve as light sources which emit light that is directed by a rod-shaped half-cylinder lens L such that it is laterally injected into the illumination unit. The latter comprises on a substrate S, a light-conducting core WL in the form of a layer, a cladding C and a volume grating VG. M denotes a conducted mode and TE indicates the direction of the transverse electric field at the point of entry into the waveguide. The evanescent field which penetrates the cladding C supplies light to the volume grating VG. This supplied portion of the light is diffracted towards an SLM (not shown here). The cladding C comprises a taper (not shown in this drawing) in the direction of incidence.

Above the illumination unit, a collimated wave front WF is shown by a dotted line which propagates in the direction indicated by the arrow for example to illuminate an SLM. Incoherent LEDs may be used instead of the laser diodes.

The flat illumination unit according to this invention has the following working principle: Referring to FIG. 1, the light which propagates through the light-conducting core WL initially runs parallel through the light-conducting core, because the evanescent wave field does not reach the surface of the cladding C. As the cladding C tapers down in the direction of propagation, the evanescent wave field comes closer to the surface of the cladding C, that is to the interface of cladding and output coupling grating. This is to compensate the loss of intensity of the light that occurs when the light propagates in the light waveguide WL, so that the waveguide WL or light waveguide permanently realises a homogeneously shining illumination unit. A part of the light leaves the waveguide and the remaining part continues to propagate through the waveguide WL in a zig-zag line with modes >0. The light which exits areally at an angle is deflected by the deflection layer CL such that it falls on the light modulator RSLM as a collimated wave field WF. This is indicated by the dotted arrows.

The deflection layer CL is polarisation-sensitive, which means that it acts as a polarisation beam splitter for the injected light. It serves both for areal output coupling and for deflection of the evanescent wave field of the light which propagates through the light-conducting core WL.

After modulation by the reflective pixels of the light modulator RSLM, the light passes through the λ/4 layer QWP of the light modulator and illumination unit again. After the second passage of the λ/4 layer QWP, the initial polarisation TE of the light is turned by 90 degrees. The light now has a TM polarisation and is modulated by the pixels with values for the presentation of information. The light leaves the light waveguide collimated as a modulated wave front ML and falls on the electrowetting prism cell array EWPAR (FIGS. 2 and 3). This direction of propagation is indicated by three broken arrows. The wave front ML now has a polarisation TM which is perpendicular to the direction of light propagation and perpendicular to the initial polarisation.

Now, another embodiment of the present invention will be described with the example of a flat illumination unit in the form of a frontlight for illuminating a reflective controllable light modulator and a detail of it is illustrated schematically in the top view in FIG. 5.

The light modulator is a reflective controllable light modulator similar to that described in the published document DE 10 2007 063382 A1.

The reflective controllable light modulator RSLM comprises at least one transmissive substrate layer with an arrangement of retroreflectors RR and at least one transmissive controllable layer which has a pixel array with pixels P1, . . . , Pn. The retroreflectors RR each comprise a stripe-shaped prism rod PR which has two reflective prism faces which are arranged at an angle to each other. The prism rods PR are arranged side by side and parallel in the horizontal direction and its reflective prism faces lie within the transmissive substrate layer. The third face is the light entry and exit surface in the prism rods PR. These light entry and exit faces of the prism rods PR are connected with the transmissive layer of the pixel array, where each prism rod PR is assigned with two columns of pixels P1 and P2 in the embodiment.

The transmissive controllable layer comprises an LC material whose liquid crystals can comprise different LC modes. During the manufacturing process, the LC material is oriented alternately in stripes e.g. in the ECB mode (vertically oriented) and in the twisted nematic (TN) mode to be used as a pixel array. To realise the orientation of the LC material, alignment layers are arranged in the substrate layer as known in the prior art, said alignment layers not being shown in FIG. 5 in order to maintain a certain clarity of the drawing. The electrode arrangements which serve to address the pixels are not shown either. The pixels P1, . . . , Pn can be controlled individually by modulation control means as addressed by a system controller CU, where it is also possible that more than two pixels are commonly addressed to form macro-pixels. The pixels P1, . . . , Pn can be controlled by an active matrix structure. The latter can be arranged e.g. as a CMOS matrix on the back of the reflective light modulator RSLM as a backplane. The transmissive pixel electrodes can be bonded to the backplane through the transmissive substrate layer of the retroreflectors RR.

Further, an areal polarisation filter PM is arranged on the side of light incidence of the reflective light modulator RSLM, said polarisation filter comprising stripe-shaped regions VP for vertical polarisation and regions HP for horizontal polarisation of incident light, said regions corresponding with the position and width of the pixel columns. Two adjacent regions VP and HP cover the pixels P1 and P2, respectively, of the pixel array in FIG. 5. Other assignments of stripe-shaped regions of a polarisation filter with controllable pixel arrays, e.g. involving macro-pixels, are possible which serve to polarise the incident light. This may for example become necessary if the LC material does not provide an ECB and TN mode, but a VP and HP mode.

Figure 5:
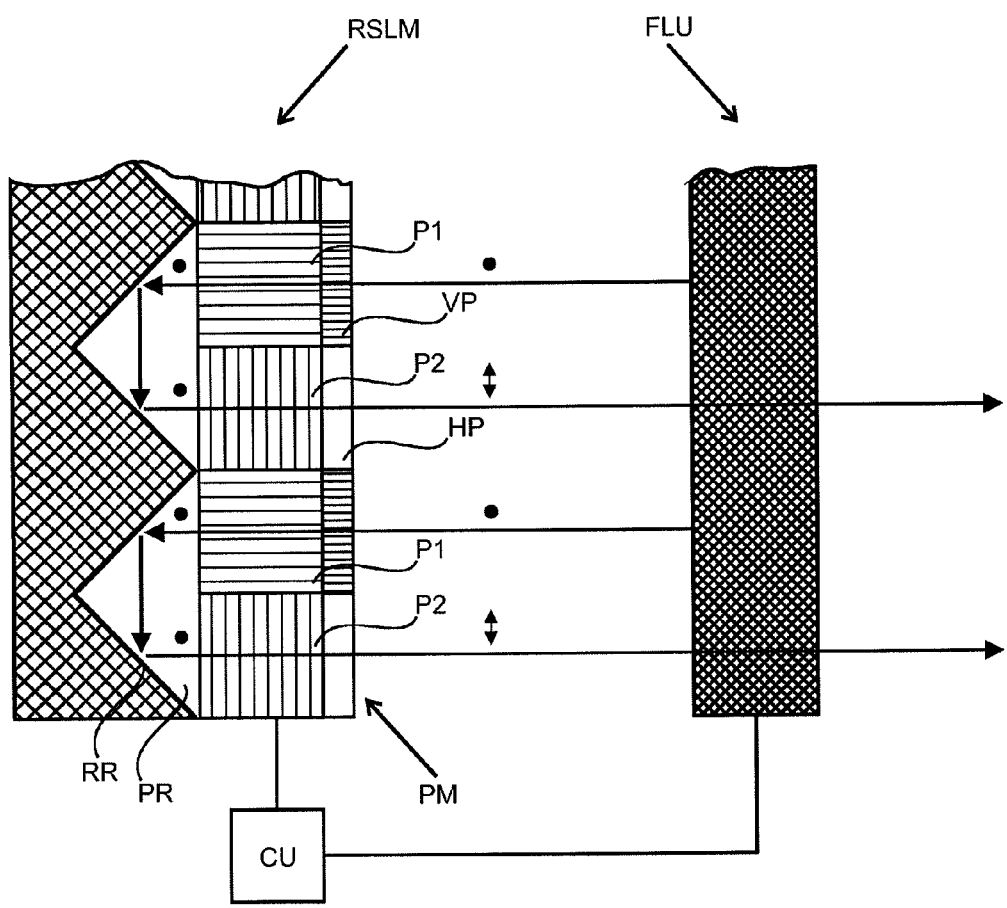
FIG. 5 is a top view which shows schematically details of a further embodiment of a flat illumination unit in the form of a frontlight device for illuminating a reflective light modulator, and FIGS. 6 to 11 each show schematically an embodiment of the present invention.
Figure 6:
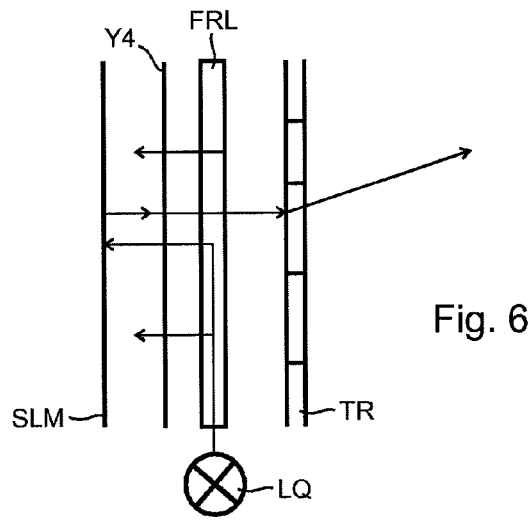
Figure 7A:
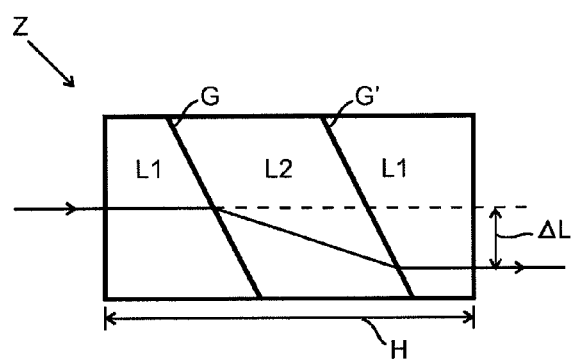
Figure 7B:
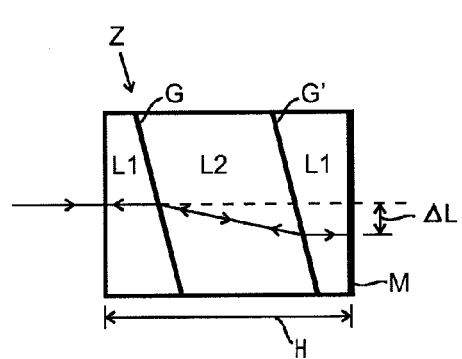
Figure 8:
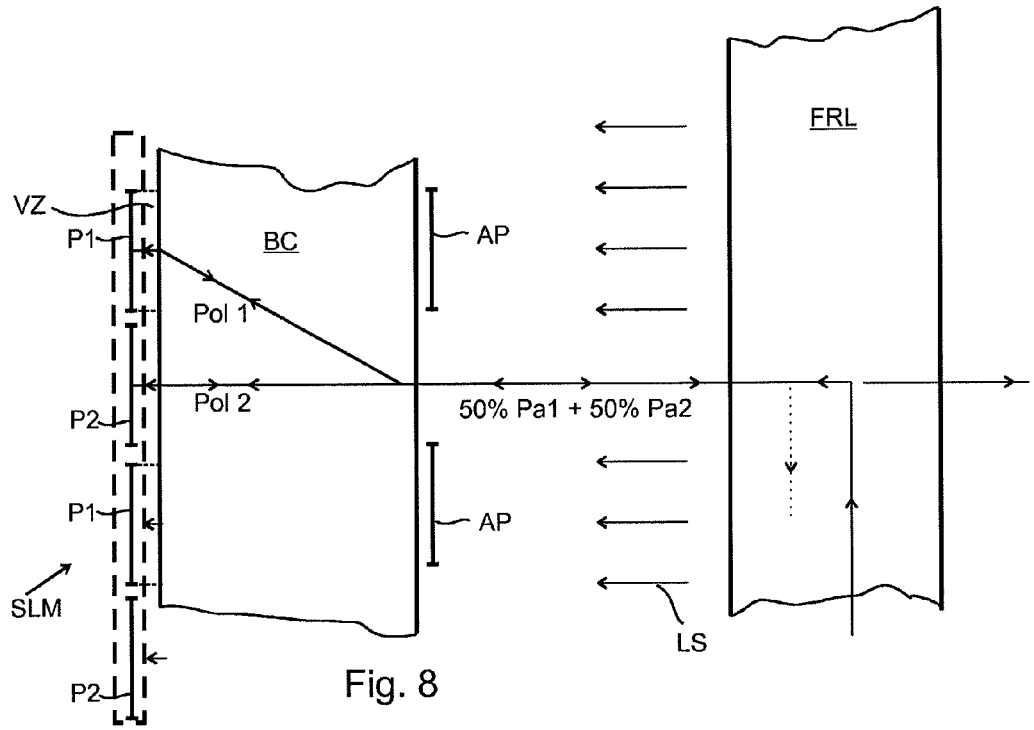
Figure 9A:
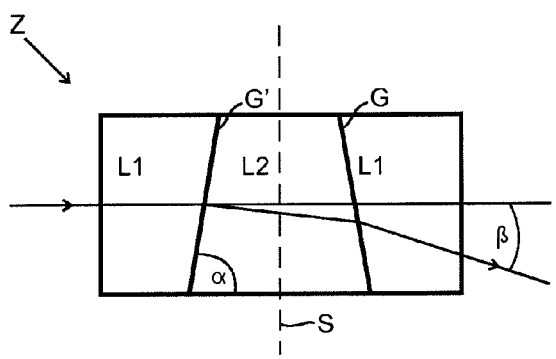
Figure 9B:
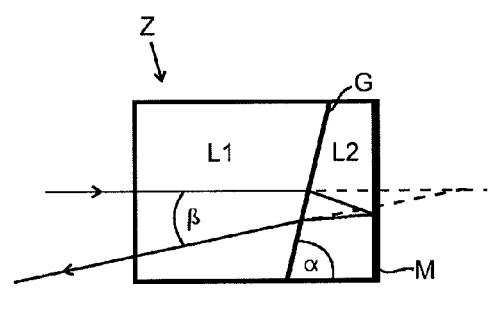
Figure 10A:
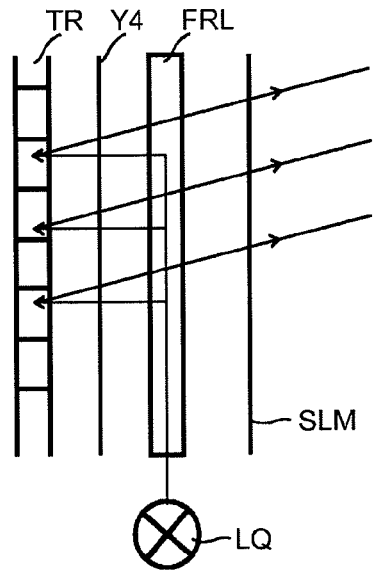
Figure 10B:
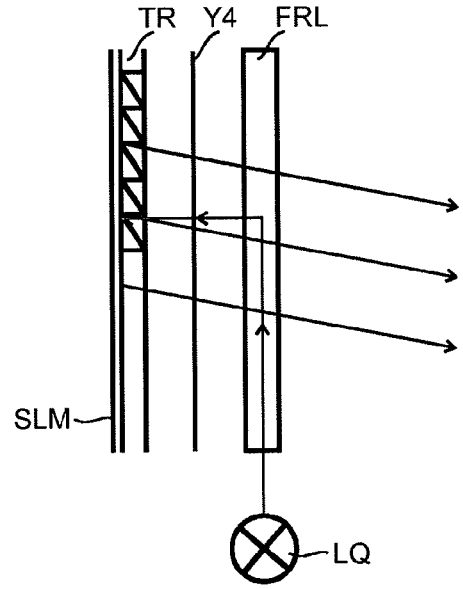
Figure 11:
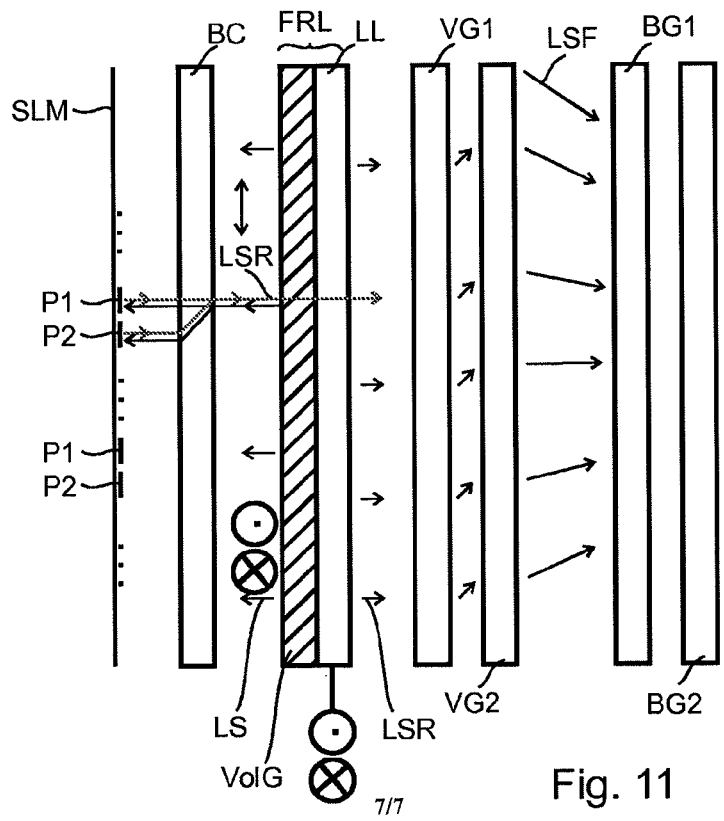

Vertical polarised, substantially collimated light from an illumination unit FLU, which can comprise the electronic and optical means described in FIGS. 1 to 4 in various combinations, falls on the reflective light modulator RSLM in FIG. 5. In this arrangement, the illumination unit FLU comprises a polarisation-selective hologram (volume grating) which almost completely deflects one direction of polarisation of the light while is transmits the other direction of polarisation substantially without being deflected.

The direction of polarisation parallel to the drawing plane is indicated by a double arrow, the direction of polarisation perpendicular to the drawing plane is indicated by a dot. The vertical polarised light can only pass through pixels P1 which are preceded by vertically polarising regions VP of the polarisation filter PM. Pixels P2 with horizontally polarising regions HP do not transmit light. The light gets a phase modulation in the pixel P1 due to the ECB mode of the oriented LC material. Depending on the thickness and given birefringence of the LC layer, a phase modulation of the light of up to 2π can be achieved if the arrangement is controlled as described. The light is reflected twice by the retroreflectors RR of the prism rods PR and thus be directed back parallel to the direction of incidence while the initial polarisation is maintained. When passing through pixel P2, due to the TN mode of the LC material, the direction of polarisation can be turned by up to 90°, depending on the control signals which are output by the system controller CU. The turning angle of the LC material which is set by these control signals define the amount of light that can pass through the horizontally polarising regions HP, whereby the amplitude of the light can be modulated in a range of between 0 and 1. Both the phase and amplitude of the light can thus be modulated irrespective of each other. Horizontally polarised light falls on the illumination unit FLU and passes through the illumination unit FLU without being obstructed and without being deflected towards observer eyes (not shown).

Referring to FIG. 5, after having passed the amplitude-modulating pixels P1 and P2 one after another, the light can also be given a dependent phase modulation, which is to be considered or to be compensated when controlling the phase modulating pixels P1.

A modulation of the light with complex values in the LC material which is oriented in the ECB and TN mode in the reflective light modulator is optionally also possible with a uniform, unstructured polariser. It must then be defined by the controller whether the pixels P1 or P2 are to be considered as phase-modulating or amplitude-modulating pixels, respectively. This light modulator is illuminated by an illumination unit FLU according to this invention, which should preferably comprise a volume hologram as output coupling grating. On its way back from the reflective light modulator, the light can pass through the volume hologram with a small angular selectivity in order to suppress higher diffraction orders.

The modulation of complex values which represent the amplitude and phase of light which can be carried out by a single light modulator has been described with the example of the reflective light modulator RSLM with the LC modes ECB and TN and with the illumination unit according to this invention. However, it is also possible to combine other LC modes for orienting the molecules of the LC material which together permit a phase modulation in a range of between 0 and 2π and a transmittance in a range of between 0 and 1.

It is essential that the entire range of values from 0 to 2π for the phase and from 0 to 1 for the amplitude can be covered by the modulation. Further, the condition shall be satisfied that the exit polarisation of the pixels P2 is perpendicular to the entry polarisation of the pixels P1. Such a reflective light modulator can generate a phase- and amplitude-modulated wave front, thereby preferably omitting an additional beam combiner.

The manufacture of a light modulator in which the pixels alternately work in the ECB and TN mode can for example involve the application of a polyimide layer which serves as alignment layer and which can be made by way of photo-structuring. The LC material can for example be aligned with the cover glass of the pixel array if it shows a structured orientation of the surface. The cover glass can have an exposed height profile so that the LC layers in the pixels P1 and P2 have different thicknesses.

A light modulator device comprises at least one reflective controllable light modulator RSLM as shown in FIG. 5 and a flat illumination unit FLU according to this invention as a frontlight, the illumination unit being designed according to one or more of FIGS. 1 to 4. In the reflective controllable light modulator, always at least two adjacent pixels can be configured such to modulate phase and/or amplitude because of a different LC mode, where the always at least two pixels can be controlled in the horizontal direction, which is pictured in FIG. 5, and/or in the vertical direction. The light modulator device can be used preferably in a holographic display for the reconstruction of three-dimensional scenes. It can also be combined with devices for beam deflection and focussing.

The deflection layer in FIG. 1 can be a micro-prism array layer where the geometry of the micro-prism array is optimally adapted to the scattering angle which is to be realised. Also, a scattering layer can realise the polarisation-selective deflection of the incoherent light.

In one embodiment to be realised, the refractive index difference Δn between light-conducting core and cladding is reduced the further the light propagates in the core. Consequently, the penetration depth of the evanescent field into the cladding increases at the same time.

When the two components—core and cladding—are combined, the construction can be such that the refractive index of one component (e.g. the cladding) increases or the refractive index of the other component (e.g. the core) decreases, or both. This means that the reduction in the difference of the refractive indices Δn between core and cladding as the light propagates can be achieved in different ways.

This must be taken into consideration during the manufacture e.g. by way of vapour deposition of the cladding onto the core, or during the manufacture of the core. It is for example possible to modify the composition of the material along the way of light propagation in order to affect the light intensity to be coupled out.

In the present embodiment, the substrate S has a low refractive index n, while the waveguide WL has a high refractive index n and the following cladding C again has a low refractive index N. The material of the subsequent volume grating VG also has a low refractive index n. The illumination unit can also be used in conjunction with a transmissive version of a display device. It is then arranged upstream of the SLM, λ/4 plate and substrate plate with backplane, seen in the direction of light propagation. However, in this arrangement not the entire substrate layer is available for accommodating the circuits and conductors.

If in a further embodiment the deflection layer is given a fluorescent layer and if UV light is used, then it is possible to generate white light for a standard flat 2D display. The latter can also be used for autostereoscopic presentations of 3D contents.

Since a homogeneous illumination is essential, the factor of the intensity which is present locally between the cladding and deflection layer and the output coupling efficiency shall preferably be constant. The output coupling efficiency results from the actual design of the deflection layer.

Alternatively, the light-conducting core can also be designed as a 45°/−45° zig-zag arrangement which works in the total internal reflection mode. A thickness of 1 mm of the illumination unit is difficult to achieve with large-area display panels. However, increasing the tolerable thickness can also be achieved by imaging the SLM pixels onto the EWPAR cells. However, aperture masks should be used for one or two additional micro-lens arrays. They aim to suppress cross-talking of the light which comes from adjacent pixels and not from the pixel which is assigned to the respective EW cells.

The closer the EW prisms are arranged to the light modulator the better they prevent diffraction-induced cross-talking.

An illumination unit with a planar light waveguide which has a thickness of less than 1 mm can be provided for a reflective light modulator with the described embodiments. This makes it possible to give a reflective direct-view display a very flat design. Since it can also be operated with incoherent light, it can also be used for autostereoscopic display devices and 2D display devices.

Reflective light modulators such as those based on LCoS, micro-mirrors, micro-tip reflectors or reflecting magneto-optic SLMs can also be used as tiles to be assembled to form larger areas. However, the gap size must then be such that it is not visible for the user, e.g. be as small as 100 μm.

A wire grid polariser can be arranged in front of the EW prism cell array in order to realise a flawless TM polarisation condition.

Finally, it must be said that the embodiments described above shall solely be understood to illustrate the claimed teaching, but that the claimed teaching is not limited to these embodiments.

The invention claimed is:

1. Illumination unit comprising a substantially planar light waveguide and at least one light source device for illuminating a controllable spatial light modulator, wherein the light waveguide comprises a planar light conducting core and a planar cladding, wherein the light modulator comprises a pixel matrix, wherein the light source device is arranged on the side of the light waveguide and wherein the light emanating from at least one light source of the light source device propagates areally though the planar light waveguide, wherein the planar light waveguide comprises on top of the cladding a planar deflection layer with a predefined output coupling characteristic for areally output coupling and deflecting an evanescent wave field of the light which propagates in the light waveguide such that a defined emission angle for homogeneously illuminating the controllable spatial light modulator is achieved, wherein the cladding is made such that its thickness tapers down in a direction of light propagation or wherein the cladding comprises a constant thickness.

2. Illumination unit according to claim 1, wherein the thickness of the cladding is decreases starting from the light entry side of the waveguide along a direction of light propagation to the opposite side of the waveguide.

3. Illumination unit according to claim 1, wherein the light emanating from the light source device is partially coherent in one direction, or incoherent in either direction.

4. Illumination unit according to claim 3, wherein an electrowetting prism cell array or a light deflecting layer is arranged behind the illumination unit in the direction of light propagation, wherein the deflection is variably controllable or wherein an electrowetting prism cell array or a light deflecting layer is arranged behind the illumination unit in the direction of light propagation, wherein the deflection is variably controllable, and wherein a distance between the pixel matrix and the electrowetting prism cell array or the other light deflecting layer lies in a range of 10-15×the period of the pixels of the pixel matrix in the coherent direction.

5. Illumination unit according to claim 1, where the deflection layer comprises at least one holographic volume grating or wherein the light emanating from the light source device is coherent.

6. Illumination unit according to claim 5, wherein the cladding comprises a substantially constant thickness and wherein the volume grating has an exponentially increasing output coupling efficiency or wherein the cladding comprises a constant thickness and wherein the light-conducting core comprises an increasing thickness along the direction of light propagation.

7. Illumination unit according to claim 5, wherein the volume grating is manufactured by overexposing to the second peak of the diffraction efficiency.

8. Illumination unit according to claim 1, wherein the light propagates in the light waveguide in a collimated manner in at least one direction, or wherein the light propagates in the light-conducting core on a zig-zag path.

9. Illumination unit according to claim 1, wherein the taper of the cladding has a substantially exponential distribution.

10. Illumination unit according to claim 1, wherein the spatial light modulator is of a transmissive type.

11. Illumination unit according to claim 1, wherein the deflection layer comprises a luminescent layer or a fluorescent layer for converting UV light into white light.

12. Illumination unit according to claim 1, wherein the light-conducting core and the cladding comprise a refractive index difference $\Delta n$ relative to each other which along the optical path in order to increase the penetration depth of the evanescent decreases field into the cladding.

13. Illumination unit according to claim 1, wherein a $\lambda/4$plate or retardation plate is arranged downstream of the output coupling side in the direction of light propagation.

14. Illumination unit according to claim 13, wherein the light modulator is adapted to modulate the phase of the light which interacts with the light modulator, and wherein a beam splitter and beam combiner device is provided between the reflective light modulator and the illumination unit.

15. Illumination unit according to claim 13, wherein the light modulator is adapted to modulate the phase of the light which interacts with the light modulator, wherein the light modulator comprises a matrix of reflective electro-wetting cells.

16. Illumination unit according to claim 1, wherein the light modulator is of a reflective or transmissive type, wherein the light modulator is arranged downstream of the output coupling side in the direction of light propagation or wherein a reflective light modulator is arranged downstream of the output coupling side in the direction of light propagation, said light modulator comprising a reflective layer with a predefined scattering characteristic.

17. Illumination unit according to claim 1, wherein a transmissive or reflective beam deflection device is arranged downstream of the output coupling side in the direction of light propagation or wherein a transmissive or reflective beam deflection device is arranged downstream of the output coupling side in the direction of light propagation and wherein the beam deflection device comprises at least one transmissive or reflective electrowetting cell array or a diffraction device.

18. Illumination unit according to claim 1, wherein the light which is coupled out of the illumination unit passes through the illumination unit substantially without being deflected after a reflection at the light modulator being of a reflective type.

19. Light modulator device comprising a reflective light modulator, which is illuminated by an illumination unit according to claim 1, wherein the reflective light modulator comprises at least one areal polarisation filter, an addressable transmissive layer with a matrix of pixels and a transmissive substrate layer with a matrix of retroreflectors.

20. Light modulator device according to claim 19, wherein the matrix of pixels of the reflective light modulator comprises at least one LC material which is controllable by the system controller for at least two LC modes being oriented differently for modulating the phase and/or the amplitude of polarised light.

21. Light modulator device according to claim 19, wherein phase and amplitude values of a hologram of a 3D scene are encodable in the pixels of the reflective light modulator.

22. Direct-view display with a light modulator device according to claim 19, wherein the spatial light modulator is arranged downstream of the illumination unit seen in the direction of light propagation.

23. Direct-view display with an illumination unit according to claim 1, wherein the spatial light modulator is arranged downstream of the illumination unit seen in the direction of light propagation.

24. Illumination unit according to claim 1, wherein the deflection layer comprises a polarization-sensitive function.

25. Illumination unit according to claim 24, wherein the spatial light modulator is of a reflective type and comprises a layer that turns the entry polarisation of the light that is coupled out such that a settable exit polarisation is achieved after the second passage of that layer.

26. Illumination unit according to claim 25, wherein said layer is a $\lambda/4$layer or a structured layer or an unstructured layer.

27. Illumination unit according to claim 25, wherein a scattering layer realises the polarisation-selective deflection or wherein the polarisation-selective deflection is realised by a layer with a micro-prism array, wherein the geometry of the micro-prism array is optimally adapted to a scattering angle which is to be realised.

* * * * *